(12) United States Patent
Frankel et al.

(10) Patent No.: US 9,065,247 B2
(45) Date of Patent: Jun. 23, 2015

(54) DIFFERENTIATION OF POWER AND CHANNEL COUNT CHANGES IN OPTICALLY AMPLIFIED LINKS

(71) Applicant: Ciena Corporation, Hanover, MD (US)

(72) Inventors: Michael Y. Frankel, Baltimore, MD (US); Balakrishnan Sridhar, Ellicott City, MD (US); Jay Simpson, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 132 days.

(21) Appl. No.: 13/737,678

(22) Filed: Jan. 9, 2013

(65) Prior Publication Data

US 2013/0148192 A1 Jun. 13, 2013

Related U.S. Application Data

(62) Division of application No. 11/230,458, filed on Sep. 21, 2005, now Pat. No. 8,373,926.

(60) Provisional application No. 60/634,537, filed on Dec. 10, 2004.

(51) Int. Cl.
*H04B 10/17* (2006.01)
*H04J 14/02* (2006.01)
*H01S 3/10* (2006.01)

(52) U.S. Cl.
CPC ......... *H01S 3/10007* (2013.01); *H01S 3/10015* (2013.01); *H04J 14/0221* (2013.01); *H04J 14/0279* (2013.01); *H04J 14/0284* (2013.01); *H04J 14/0246* (2013.01); *H04J 14/025* (2013.01); *H04J 14/0275* (2013.01)

(58) Field of Classification Search
CPC . H04J 14/0221; H04J 14/0246; H04J 14/025; H04J 14/0275; H04J 14/0279; H04J 14/0284; H01S 3/10015
USPC .............................. 359/341.4, 341.41, 341.42
See application file for complete search history.

(56) References Cited

U.S. PATENT DOCUMENTS

| | | | |
|---|---|---|---|
| 5,623,355 A | 4/1997 | Olsen | |
| 5,808,760 A | 9/1998 | Gfeller | |
| 5,831,982 A | 11/1998 | Hummel | |
| 5,900,968 A | 5/1999 | Srivastava et al. | |
| 5,923,462 A | 7/1999 | van der Plaats | |
| 6,043,928 A | 3/2000 | Walker et al. | |
| 6,233,235 B1 | 5/2001 | Burke et al. | |
| 6,304,347 B1 | 10/2001 | Belne et al. | |
| 6,356,386 B1 | 3/2002 | Denkin et al. | |

(Continued)

OTHER PUBLICATIONS

J.L. Syskind, et al., "Fast power transients in optically ampliffied multiwavelength optical networks," paper PD31-2, OFC 1996.

(Continued)

*Primary Examiner* — Eric Bolda
(74) *Attorney, Agent, or Firm* — Clements Bernard PLLC; Christopher L. Bernard; Lawrence A. Baratta, Jr.

(57) ABSTRACT

Exemplary embodiments of the invention are drawn to a method and apparatus for the differentiation of power and channel count changes in optically amplified links. Additionally, configuration of a corresponding optical amplifier can be based on the determination of the power and channel count changes.

14 Claims, 5 Drawing Sheets

(56) References Cited

U.S. PATENT DOCUMENTS

| | | |
|---|---|---|
| 6,480,497 B1 | 11/2002 | Flammer, III et al. |
| 6,621,621 B1 | 9/2003 | Jones et al. |
| 6,657,186 B2 | 12/2003 | Graves |
| 6,765,659 B1 | 7/2004 | Bhatnagar et al. |
| 6,775,056 B2 | 8/2004 | Grubb et al. |
| 6,919,987 B2 | 7/2005 | Takatsu et al. |
| 6,937,387 B1 * | 8/2005 | Saint Georges et al. . 359/337.11 |
| 7,046,429 B2 | 5/2006 | Halevi et al. |
| 8,373,926 B2 | 2/2013 | Frankel et al. |
| 2002/0149840 A1 | 10/2002 | So et al. |
| 2003/0099032 A1 | 5/2003 | Asao et al. |
| 2003/0106990 A1 | 6/2003 | Tomofuji et al. |
| 2004/0146306 A1 | 7/2004 | Muzicant et al. |

OTHER PUBLICATIONS

"Fast link control protection for surviving channels in multiwavelength optical networks," postdeadline peer, ECOC 1996.

Y. Liu, et al., "Transietn gain control in EDFA's by dual-cavity optical automatic gain control," IEEE PTL, vol. 11, No. 11, pp. 1381-1383, Nov. 1999.

* cited by examiner

DIFFERENTIATION OF POWER AND CHANNEL COUNT CHANGES IN OPTICALLY AMPLIFIED LINKS

CROSS-REFERENCE TO RELATED APPLICATIONS

The present Application for Patent is a Divisional of patent application Ser. No. 11/230,458 entitled "DIFFERENTIATION OF POWER AND CHANNEL COUNT CHANGES IN OPTICALLY AMPLIFIED LINKS" filed 21 Sep. 21, 2005, pending, assigned to the assignee hereof and hereby expressly incorporated herein by reference in its entirety and which claims the benefit of U.S. Provisional Patent Application No. 60/634,537, filed Dec. 10, 2004. The disclosure of which is incorporated herein by reference in its entirety.

BACKGROUND OF THE INVENTION

1. Field

Exemplary embodiments of the present invention generally relate to data transmission over fiber optic networks. More particularly embodiments of the present invention relate to the detection of power transients in fiber optic networks.

2. Background

Current fiber-optic long-haul communication networks are predominantly comprised of point-to-point fiber-optic links. The data-modulated optical signals originated at one end and propagate through the fiber medium to the opposite end. While propagating through the fiber medium, the optical signals can suffer attenuation due to the scattering in the fiber medium, as well as losses in other components such as couplers, connectors and the like. To compensate for the loss, optical amplifiers can be placed at regular intervals along the fiber span, typically 40 to 100 km apart. A single fiber strand can carry many independent multiple optical signals (e.g., >100), each signal being differentiated by a slightly different wavelength (e.g., 0.4 nm separation). Accordingly, optical amplifiers amplify all the wavelengths simultaneously. As is known in the art, it is common for the optical amplifiers to be operated in a saturated mode having a fixed total optical power output, but variable gain.

More recently, optical communication networks have started to evolve away from simple point-to-point links. The first step was the introduction of fixed optical add-drop multiplexers (OADMs). The OADMs can be positioned at intermediate points along the fiber-optic link between the terminal ends, and provide the capability for adding or dropping individual wavelengths. This diversity of signal origination and termination points allows for more flexible and useful optical network architectures. A second evolutionary step was the addition of dynamic OADM capability, such that individual optical wavelength signals can be dynamically switched and rerouted between various fiber-optic links.

However, both of the above scenarios create a problem in controlling optical power in each wavelength. As previously mentioned, optical amplifiers are commonly operated such that they provide a fixed total output power (constant power mode), which is proportioned among the various wavelengths. This configuration provides an undesirable coupling mechanism among the optical wavelengths. Optical wavelength signals can appear and disappear in the fiber-optic link, either due to component failures and/or fiber cuts in the fixed OADM case, or due to active wavelength switching in the dynamic OADM case. As optical wavelength signals disappear, optical amplifiers operating in a constant power mode allocate the unused power to the remaining signals potentially causing a substantial increase in their power. Conversely, newly added optical wavelengths can cause substantial power drop in the already existing ones.

These optical power transients can be detrimental for several reasons. Optical power exceeding the receiver's dynamic range may cause loss of data on the low end and potential permanent component damage on the high end. For example, reduced optical wavelength power can cause signal to noise degradation and may result in a loss of data. Likewise, increased optical wavelength power can cause nonlinear signal distortions and noise and may result in a loss of data. Finally, optical power transients may disrupt seemingly unrelated parts of the network complicating alarm management and troubleshooting.

Additionally, the problem of channel loss exists. Channel loss can occur for several reasons in an optical network. For example, a fiber cut can occur between a first OADM and first optical line amplifier (OLA), which can cause a wavelength λ1 to be removed from the downstream optical amplifier chain. Poor connection quality, degradation or failure of components, and the like can also cause channel loss.

In one conventional system, the OLAs are held in constant power mode in an attempt to prevent channel/wavelength loss. In this system, the OLA pump power is held constant. Assuming a three channel system, if the second channel is lost, the available OLA output power is redistributed to the first and third channels, thereby proportionately increasing their power. However, fiber nonlinear effects may become detrimental to proper signal propagation, and data associated with these wavelengths may be lost.

In another conventional system, the OLAs are held in constant gain mode to prevent channel loss. OLA gain may be controlled via electronic feedback to the pump power, via optical feedback of a lasing wavelength, or other methods known in the art. In all cases, there is some finite error in gain in each amplifier associated with feedback circuit errors and response time, excited state absorption, and/or spectral hole burning, for example. Further, fiber nonlinear effects such as cross-channel Raman gain can substantially perturb the gain experienced by channels remaining in the system. Thus, remaining channel power can either increase or decrease in an unpredictable manner. If such deviations exceed the dynamic range of the system, data associated with these wavelengths will be lost.

As previously mentioned, a problem in conventional systems is loss increase due to fiber pinch or connector mismatching. A conventional system may attempt to limit loss by holding OLAs in constant power mode. The transmission system thus keeps channel output power constant for subsequent spans. However, the OLA immediately following the span where the loss increase occurred will likely experience a noticeable spectral tilt in overall gain. This may lead to data loss in the channels, particularly at the extreme ends of the spectrum.

In contrast, when the OLAs are held in constant gain mode the channel power in all subsequent spans will decrease by the same amount. This can lead to a substantial decrease in the optical signal to noise ratio. Accordingly, the data associated with these wavelengths may be lost.

Consequently, a need still exists for a system which provides a solution to the aforementioned data/signal loss problems in the conventional systems that operate in a constant power or constant gain mode.

SUMMARY OF THE INVENTION

Exemplary embodiments of the invention are drawn to methods and systems for the differentiation of power and channel count changes in optically amplified links.

Accordingly, an embodiment of the invention can include a method comprising: measuring a first parameter from a first signal received at a node; measuring a second parameter from a second signal received at the node; comparing the first parameter to a third parameter and the second parameter to a fourth parameter; and identifying a type of system perturbation based on the comparisons.

Another embodiment of the invention can include a method comprising: measuring a first parameter from a first signal received at a node; measuring a second parameter from a second signal received at the node; comparing the first parameter to a third parameter and the second parameter to a fourth parameter; and determining an optical amplifier configuration at the node based on the comparisons.

Another embodiment of the invention can include an apparatus optical amplifier node comprising: signal power detection logic configured to measure a first parameter from a first signal received at a node, and configured to measure a second parameter from a second signal received at the node; comparison logic configured to compare the first parameter with a third parameter and the second parameter with a fourth parameter; and identification logic configured to identify a type of system perturbation based on the comparisons.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
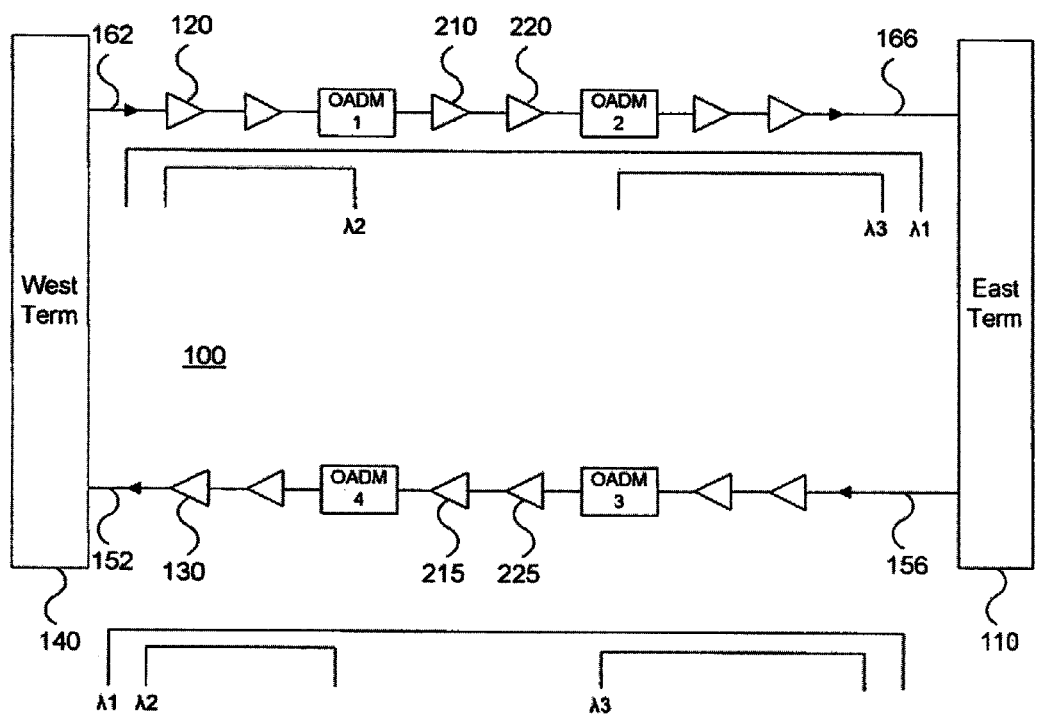
FIG. 1 is an illustration of the system architecture in accordance with at least one embodiment of the present invention.

Aspects of the invention are disclosed in the following description and related drawings directed to specific embodiments of the invention. Alternate embodiments may be devised without departing from the spirit or the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The expression communicates, coupled, connection, and connected as used herein refers to any connection, coupling, link and the like by which signals carried by one system element are imparted to the communicating element. Further, the devices described are not necessarily directly connected to one another and may be separated by intermediate components or devices.

The term "service channel" as used herein refers to a wavelength of an optical communication system such as a WDM, SONET or SDH-based system that is used to carry operational, administrative, maintenance, and/or provisioning information and is synonymous with "optical supervisory channel", "OSC", "optical service channel" or other industry terms that refer to these functions. A service channel may be "in-band" meaning that the service channel wavelength lies within the data wavelength transmission window of a WDM system (e.g., within the range of about 1500 nm-1590 nm). A service channel may also be "out-of-band" meaning that the service channel wavelength is outside the wavelength transmission window of the WDM system. Typically, the service channel signal is carried on a wavelength separate from those of the data signals (out-of-band). Examples of service channel wavelengths include, but are not limited to, 1310 nm, 1510 nm and 1625 nm in typical fiber-optic communication systems.

The term "service channel modem" as used herein refers to any device capable of handling the transmission and receipt of a service channel. More specifically, service channel modems handle a service channel that is optically added/multiplexed onto the same fiber as the WDM data signals, using wavelength-multiplexing filters or equivalent. After propagating through an optical fiber link, the service channel signal is optically dropped/demultiplexed from the data signals using wavelength-selective filters or equivalent and detected by an optical receiver in the downstream service channel modem.

FIG. 1 illustrates an optical network architecture that can be used in at least one embodiment of the invention. Generally, information flows through a series of nodes/network elements in the network from one location or site to another. FIG. 1 illustrates a system 100 that has an East 110 and West 140 terminal. The East 110 and West 140 terminals communicate via lines (e.g., optical fiber pairs) that run between the terminals, as illustrated (e.g., lines 152 and 162). East 110 and West 140 terminals can be located a significant distance apart. Accordingly, line amplifier nodes or OLAs (e.g., 120, 130) can be interposed between the terminals (e.g., every 40-100 kilometers) to compensate for the signal loss in the transmission medium (e.g., optical fiber) by amplifying the signal. Additionally, OADMs can be located between the terminals to allow wavelengths to be added and/or dropped as desired, as is known in the art.

For example, as illustrated in FIG. 1, a wavelength λ1 is propagated between East terminal 110 and West terminal 140 in both directions. Wavelength λ2 is propagated from West terminal 140 and dropped at OADM 1 in the West to East (W-E) direction and added at OADM 4 and propagated to West terminal 140 in the East to West (E-W) direction. Likewise, wavelength λ3 is added at OADM 2 and propagated to East terminal 110 in the W-E direction and propagated from East terminal 110 and dropped at OADM 3 in the E-W direction. As previously discussed the intentional or unintentional addition and/or removal of channels can cause perturbations to the downstream optical amplifiers.

Embodiments of the invention address determining the channels (wavelengths) remaining in a fiber-optic link after a network perturbation. Solely for purposes of illustration, perturbations can be grouped into two broad categories. The first broad category can be considered passive loss changes, such as those due to fiber bends, poor connector mating, component drift, and the like. The second broad category can be considered to be wavelength (or channel) count changes due to fiber cuts, fiber restoration, optical switch reconfiguration, and the like. To differentiate passive loss changes and wavelength/channel count changes, embodiments of the invention can monitor the power in an Optical Service Channel (OSC).

Figure 2:
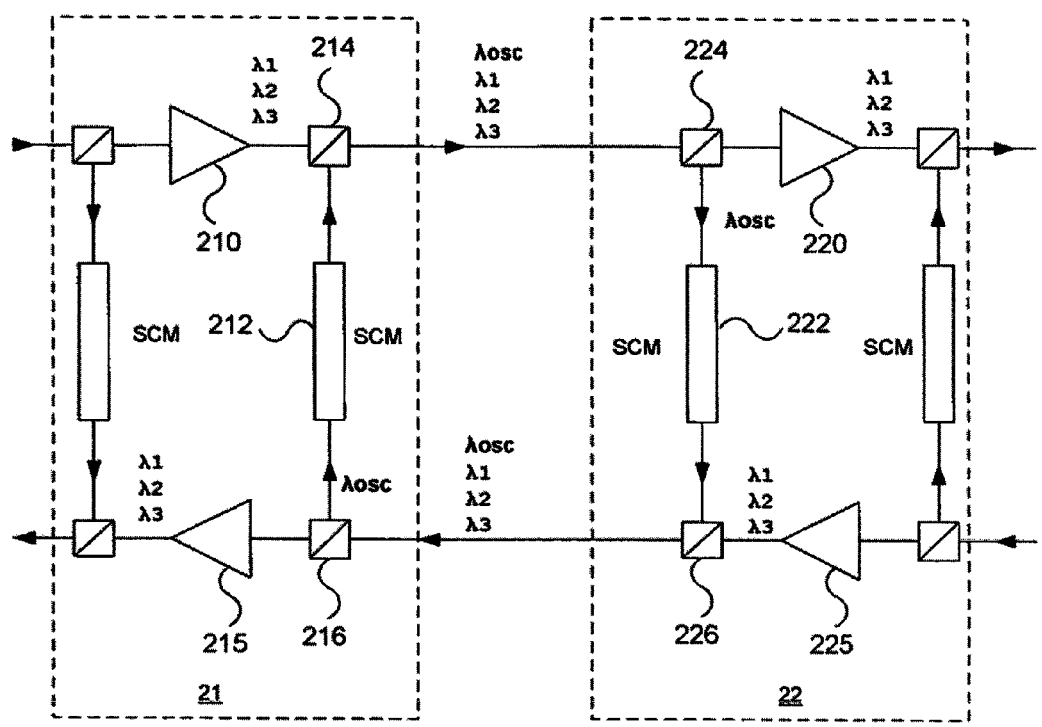
FIG. 2 is an illustration of the optical service channel architecture in accordance with at least one embodiment of the present invention.

As can be seen from FIG. 2, each service channel modem (SCM), e.g., 212, 222, receives its signal from one direction (e.g. East) and transmits it back to the sending node in the opposite direction (e.g., West). Accordingly, a pair of SCMs, one at each adjacent node (21, 22), can support a duplex/bidirectional communication link over the two-fiber span, as illustrated in FIG. 2. However, although two SCMs have been illustrated per node, a node may only have one SCM (e.g., at a border location, terminal position, head-end/tail-end node, etc.) Additionally, communication between SCM's at each node can be accomplished using a local bus or backplane in the node to allow information to be propagated to other nodes in the network. Further, since each SCM has a photo-receiver, controller and the like as is known in the art, each SCM can detect the upstream losses via a power measurement at each SCM, as is known in the art. Commonly owned U.S. Pat. No. 6,765,659 entitled "Optical Supervisory Channel Apparatus and Method for Measuring Optical Properties", which is incorporated by reference herein in its entirety, provides additional details regarding using SCMs for power measurement.

As illustrated in FIG. 2, optical service channels typically bridge passive spans between optical amplifiers (e.g., 210, 220) and are independent of OLA operation. That is, the service channel modems (e.g., SCMs 212, 222) typically perform signal processing, compensation, decoding and/or amplification operations on the OSC. For example, as illustrated in FIG. 2, filter 216 drops the OSC wavelength (λosc) to SCM 212. The remaining W-E wavelengths (λ1, λ2, and λ3) are passed to amplifier 215. SCM 212 then propagates a wavelength λosc to the add filter 214, and it is then added to the W-E wavelengths (e.g., λ1, λ2, and λ3). The OSC is dropped at the other end via filter 224 to SCM 222 and is ultimately added to the E-W wavelengths, which completes the loop. Thus, the OSC experiences the same transmission medium as the other wavelengths but is not coupled to the amplifier nodes. As such, embodiments of the present invention can use the OSC to provide a direct differentiation of passive loss changes and wavelength count changes.

For example, if both OSC power and signal wavelength powers change in the same direction (e.g., increase or decrease) and similar proportion, then a controller (e.g., 335 of FIG. 3) of the optical amplifier node can determine the change is due to passive loss. Then, the optical amplifier can be operated in a substantially constant power mode using the previously established power output, providing constant output power for each wavelength. However, if OSC power remains substantially constant but the signal wavelength power changes, then a controller of the optical amplifier can determine the change is due to a wavelength count change. The controller can establish a new power output by using the gain prior to the channel count change detection and the current optical input power, which effectively holds the power output per channel/wavelength constant. For example, if the power per channel is considered to be relatively constant then for an initial power output, a gain can be determined as the power output divided by the power input. Then, as the channel count changes the power output can be adjusted proportional based on the initial gain determined. Alternatively, the controller can establish a new power output based on the ratio of the input power prior to the channel count change and the input power currently detected to maintain a constant power output per channel/wavelength. For example, if the input power was reduced by ten percent due to the loss of several channels, then the amplifier could be set to maintain a constant output power that was ten percent less than the previously established constant power, again providing constant output power for each signal wavelength. Accordingly, embodiments of the invention can determine the cause of the change in the optical power of the signal wavelengths using the OSC and change the operating mode of the affected optical amplifier to compensate appropriately for each type of change (e.g., passive loss changes and wavelength count changes).

Those skilled in the art will appreciate that fiber-optic wavelength division multiplexed (WDM) communication networks are evolving to a mesh type network that is richly interconnected with all-optical add/drop nodes. Individual fibers carry a multiplicity of separate wavelengths (e.g. 192 channels/wavelengths), with each wavelength potentially having different ingress and/or egress points into the fiber. As wavelengths propagate and suffer losses, they are re-amplified in optical amplifiers, which provide a shared gain medium to all wavelengths simultaneously.

Such optical amplifiers are typically operated in constant power mode, in which case a change in total wavelength count in the fiber will lead to substantial power changes in the remaining wavelengths as total power is redistributed. Such power changes are detrimental to signal propagation, as previously discussed. Likewise, as previously discussed, if the optical amplifiers are operated in constant gain mode, a reduction in the signal power without a channel/wavelength loss may cause a reduction in the signal quality because the amplifier does not adjust the gain to ensure adequate power.

Embodiments of the present invention can provide substantially constant power for each wavelength remaining in a fiber-optic link after a network perturbation by using a comparison of OSC and signal power measurements. For example, if the input power to OSC and signal input power at the OLA changes in the same direction (e.g., increase or decrease in power), the OLA is operated in constant power, providing the previously established output power for all wavelengths. Thus, span loss change effects are localized to a single span, and the output power of all wavelengths are fixed. However, if the input power to OSC is substantially constant, but the signal input power changes, the OLA constant output power previously established is adjusted to compensate for the change in channel count (e.g., power detected at the signal input), again providing substantially constant output power for remaining wavelengths. Thus, wavelength count changes do not adversely impact remaining wavelengths, and remaining output power for each wavelength are maintained substantially constant.

Figure 3:
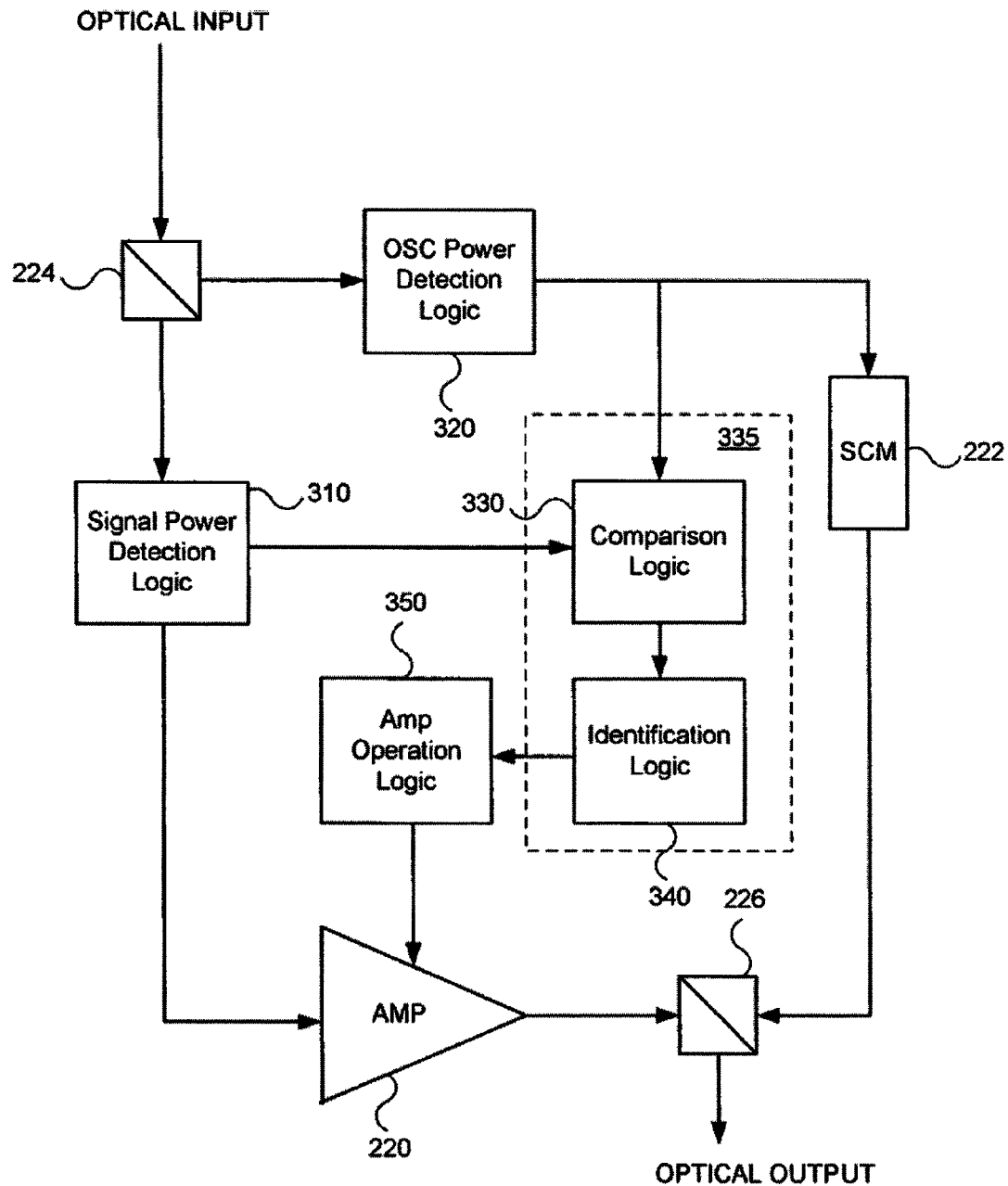
FIG. 3 is an illustration of an apparatus in accordance with at least one embodiment of the present invention.

As shown in FIG. 3, an embodiment of invention can include an apparatus having signal power detection logic 310 configured to establish a signal baseline power measurement ($Pb_{sig}$) for signals received at a node (e.g., 21, 22). Optical service channel (OSC) power detection logic 320 can be configured to establish an OSC baseline power measurement ($Pb_{OSC}$) for an OSC received at the node. Comparison logic 330 can be configured to compare power levels of the signals and the OSC at the node to the respective baseline measurements. Identification logic 340 can be configured to identify a type of system perturbation based on the power level comparisons. Further, amplifier operation logic 350 can be configured to operate an optical amplifier at the node based on the power level comparisons.

In view of the foregoing disclosure, those skilled in the art will recognize that embodiments of the invention include methods of performing the sequence of actions, operations and/or functions previously discussed. For example, an embodiment of the invention can include a method comprising measuring a first parameter (e.g., signal power) from a first signal received at a node and a second parameter (e.g., OSC power) from a second signal (e.g. OSC) received at the node. The first parameter can be compared to a third parameter (e.g., a signal baseline power measurement) and the second parameter to a fourth parameter (e.g., an OSC baseline power measurement). Then, a type of system perturbation (e.g., passive loss, channel count change) can be identified based on the comparisons, as discussed in the foregoing.

Figure 4A:
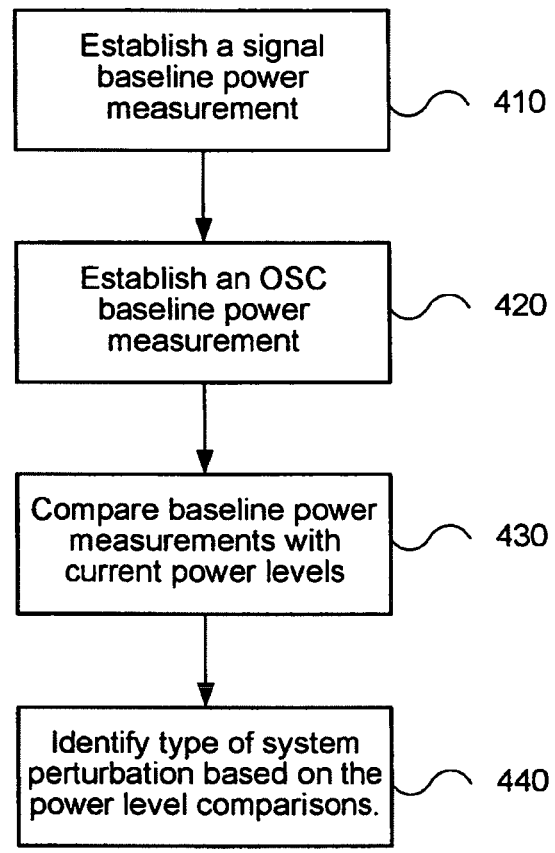
FIGS. 4A and 4B are block diagrams of methods in accordance with embodiments of the present invention.

Referring to FIG. 4A, a flowchart illustrating at least one method according to embodiments of the invention is provided. For example, the method can comprise establishing a signal baseline power measurement (Pbsig) for signals received at a node, block 410. An optical service channel (OSC) baseline power measurement ($Pb_{OSC}$) for an OSC received at the node can also be established, block 420. Typically, these power measurements can be determined at start-up/installation of the system components. However, the values can also be periodically updated to account for changes in the network. For example, these values can be updated when new hardware is added to and/or deleted from the network and the like, may be occasions when the baseline values are updated. Alternatively, the baseline values may be updated based on maintenance schedules, fixed intervals, and the like, however, the invention is not limited to these examples. Once the baseline measurements are established, the power levels of the signals (e.g., wavelengths $\lambda 1$, $\lambda 2$, $\lambda 3$, etc.) and the power level of the OSC (e.g., $\lambda osc$) at the node can be compared to the respective baseline measurements (e.g., $Pb_{sig}$ and $Pb_{OSC}$), block 430. Generally, the comparison can be performed on a substantially continuous basis, so as to minimize network interruptions. However, the invention is not limited to continuous comparisons and a comparison rates be adjusted as desired. Then, the type of system perturbation can be identified based on the power level comparisons, block 440.

Figure 4B:
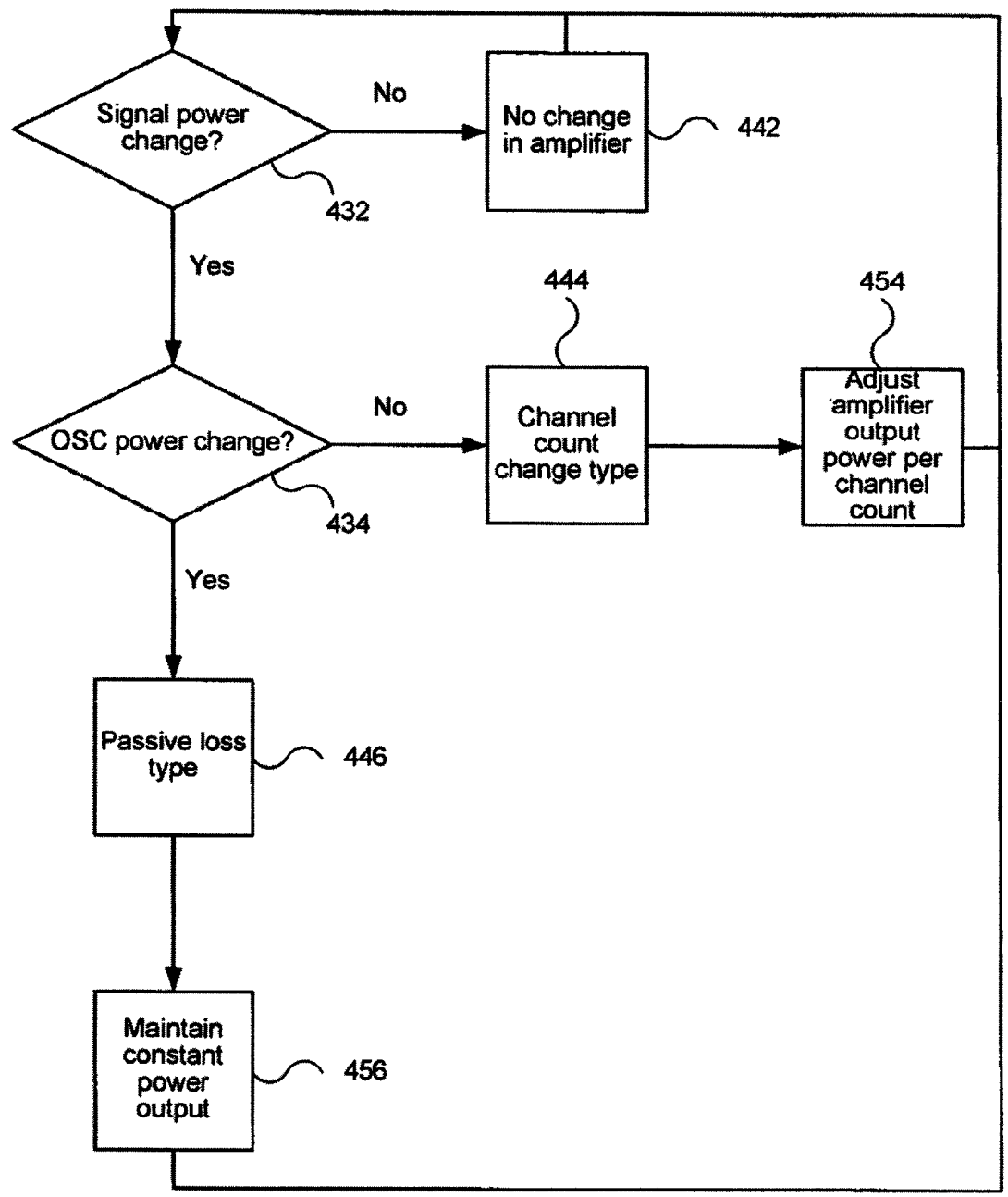

Referring to FIG. 4B, further embodiments of the invention are illustrated. For example, if the comparison of the signal power level to $Pb_{sig}$ indicates no change in the power level, block 432, then typically there is no change in the amplifier configuration. However, if the comparison of the signal power level to $Pb_{sig}$ indicates a change, block 432 and the comparison of the OSC power level to $Pb_{OSC}$ indicates no change in the power level, block 434, then a channel count change type of perturbation can be identified, block 444. If a channel count change type is identified, the output power of the corresponding amplifier (e.g., the downstream amplifier) in the node can be adjusted based on the new channel count (e.g., based on the current $Pb_{sig}$) to maintain substantially constant output power per channel, block 454. However, if the comparison of the signal power level to $Pb_{sig}$ indicates a change, block 432 and the comparison of the OSC power level to $Pb_{OSC}$ also indicates a change in the power level, block 434, then a passive loss type of system perturbation can be identified, block 446. Further, based on the identification of the passive loss type, a corresponding optical amplifier in the node can be operated (e.g. gain increased if power decreases) to maintain a substantially constant power mode, block 456. Those skilled in the art will appreciate that many techniques can be used to prevent minor perturbations and/or noise in the measurements from causing erroneous/undesired changes in the power amplifier. For example, a threshold (e.g., 0.5-1 dB) can be established and/or averaging over a short period of time can be used prevent erroneous changes and/or undesired sensitivity in the system response.

The figures included herein are provided to explain and enable the invention and to illustrate the principles of the invention. Some of the activities for practicing the invention shown in the method block diagrams of the figures may be performed in an order other than that shown in the figures, or in some configurations may optionally be omitted altogether. For example, identifying the type of perturbation may be integrated in the amplification configuration decision. Accordingly, block 440 can be directed to determining an optical amplifier configuration at a node based on the power level comparisons. Correspondingly, blocks 444 and 446 can be eliminated. Additionally, one or both of blocks 432 and 434 may include setting a threshold or window for determining if a change of power levels in the OSC and signals has occurred (e.g., +/−a predetermined value or percentage change). Alternatively, the power level of the OSC and signals may be averaged over a period of time and that average can then be compared to the previously established power levels to determine if a change has occurred.

Further, embodiments of the invention are not limited to the illustrated to the configurations illustrated. For example, embodiments of the invention can be practiced in a ring type optical network, as opposed to the configuration illustrated in FIG. 1. Accordingly, instead of East and West terminals as illustrated, add/drop nodes, such as OADM 1, can be positioned at various locations around the ring to provide ingress and egress points to the network.

Those of ordinary skill in the art will appreciate that information and signals may be represented using any of a variety of different technologies and techniques. For example, data, instructions, commands, information, and signals that may be referenced throughout the above description may be represented by voltages, currents, electromagnetic waves, magnetic fields, optical fields, or particles, or any combination thereof. Those of ordinary skilled in the art will also appreciate that the various illustrative logical blocks, modules, circuits, and algorithm routines described in connection with the embodiments disclosed herein may be implemented as electronic hardware, computer software, firmware, or combinations thereof.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Practitioners of ordinary skill in the art will know to implement the described functionality in ways tailored to suit each particular application, but such implementation decisions should not be interpreted as causing a departure from the scope of embodiments of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, computer or state machine. A processor may also be implemented as a combination of computing devices, e.g., a combination of a DSP and a microprocessor, a plurality of microprocessors, one or more microprocessors in conjunction with a DSP core, or any other such configuration.

The activities of methods, routines or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor in such a manner that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Various modifications to the illustrated and discussed embodiments will be readily apparent to those of ordinary skill in the art, and the principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In describing various embodiments of the invention, specific terminology has been used for the purpose of illustration and the sake of clarity. However, the invention is not intended to be limited to the specific terminology so selected. It is intended that each specific term includes equivalents known to those of skill in the art as well as all technical equivalents which operate in a similar manner to accomplish a similar purpose. Hence, the description is not intended to limit the invention. The invention is intended to be protected broadly within the scope of the appended claims.

Although the invention has been illustrated by reference to specific embodiments, it will be apparent to those skilled in the art that various changes and modifications may be made which clearly fall within the scope of the invention. The above description illustrates various embodiments of the invention, but, for the sake of clarity, does not provide a detailed explanation of each of the various changes and modifications which fall within the scope of the invention. Hence, the description is not intended to limit the invention. The invention is intended to be protected broadly within the scope of the appended claims.

What is claimed is:

1. A method comprising:
   measuring a first parameter from a first signal received at a node;
   measuring a second parameter from a second signal received at the node;
   comparing the first parameter to a third parameter and the second parameter to a fourth parameter; and
   identifying a type of system perturbation based on the comparisons,
   wherein the first parameter is a power measurement of the first signal, wherein the third parameter is a baseline power measurement ($Pb_{sig}$) of the first signal, wherein the second parameter is a power measurement of the second signal, and wherein the fourth parameter is a baseline power measurement ($Pb_{OSC}$) of the second signal.

2. The method of claim 1, wherein the first signal is an optical signal comprising a plurality of wavelengths and wherein the second signal is an optical service channel.

3. The method of claim 1, wherein a wavelength count change is identified if the comparison of the first signal power level to $Pb_{sig}$ indicates a change in the first signal power level and the comparison of the second signal power level to $Pb_{OSC}$ indicates substantially no change in the second signal power level.

4. The method of claim 1, wherein a wavelength count change is identified if the comparison of the first signal power level to $Pb_{sig}$ indicates a change in the first signal power level and the comparison of the second signal power level to $Pb_{OSC}$ indicates an opposite change in the second signal power level.

5. The method of claim 1, further comprising:
   establishing a new output power for an optical amplifier in the node, based on the first parameter, in response to a wavelength count change being identified as the type of system perturbation; and
   operating the optical amplifier in the node according to the established new output power.

6. The method of claim 1, wherein a passive loss is identified if the comparison of the first parameter to the third parameter indicates a change in the first signal power level and the comparison of the second parameter to the third parameter indicates a substantially similar change in the second signal power level.

7. The method of claim 6, further comprising:
   operating an optical amplifier in the node to maintain a previously established constant output power, in response to the comparison of the first parameter and the third parameter being substantially the same.

8. The method of claim 1, further comprising:
   setting a threshold for determining a change in at least one of the comparisons.

9. An optical amplifier node comprising:
   signal power detection logic configured to measure a first parameter from a first signal received at a node, and configured to measure a second parameter from a second signal received at the node;
   comparison logic configured to compare the first parameter with a third parameter and the second parameter with a fourth parameter; and
   identification logic configured to identify a type of system perturbation based on the comparisons,
   wherein the identification logic is configured to identify a passive loss if the comparison of the first parameter and the third parameter indicates a change in the input power level of the first signal and the comparison of the second parameter and the fourth parameter indicates a substantially similar change in the input power level of the second signal.

10. The optical amplifier node of claim 9, further comprising:
    amplifier operation logic configured to operate an optical amplifier at the node based on the type of system perturbation identified.

11. The optical amplifier node of claim 10, wherein the identification logic is configured to identify a wavelength count change, if the comparison of the first parameter and the third parameter indicates a change in the input power level of the first signal and the comparison of the second parameter and the fourth parameter indicates no change in the input power level of the second signal.

12. The optical amplifier node of claim 11, wherein the amplifier operation logic is configured to establish a new constant power output level for the optical amplifier in response to the wavelength count change being identified as the type of system perturbation and based on the first parameter to maintain a constant power per channel.

13. The optical amplifier node of claim 9, wherein the amplifier operation logic is configured to operate the optical amplifier in a constant power mode to maintain a previously established constant power output, in response to the first parameter and the third parameter being substantially the same.

14. An optical amplifier node comprising:

signal power processing logic configured to obtain a measurement of a first parameter associated with a first signal received at a node, configured to obtain a measurement of a second parameter associated with a second signal received at the node, and configured to compare the first parameter with a third parameter and the second parameter with a fourth parameter; and identification logic configured to identify a type of system perturbation based on the comparisons, wherein the identification logic is configured to identify a passive loss if the comparison of the first parameter and the third parameter indicates a change in the input power level of the first signal and the comparison of the second parameter and the fourth parameter indicates a substantially similar change in the input power level of the second signal.

* * * * *